(12) United States Patent
Becker et al.

(10) Patent No.: US 7,885,279 B2
(45) Date of Patent: *Feb. 8, 2011

(54) ASSIGNING A DATA CHANNEL TO MULTIPLE DATA LINKS FOR SIMULTANEOUS DATA TRANSMISSION VIA A SINGLE DATA CHANNEL

(75) Inventors: Michael Becker, Philippsburg (DE); Joachim Wietzke, Karlsruhe (DE); Harald Schöpp, Ettlingen (DE)

(73) Assignee: Becker GmbH, Karlsbad (DE)

( * ) Notice: Subject to any disclaimer, the term of this patent is extended or adjusted under 35 U.S.C. 154(b) by 426 days.

This patent is subject to a terminal disclaimer.

(21) Appl. No.: 11/738,835

(22) Filed: Apr. 23, 2007

(65) Prior Publication Data

US 2007/0268923 A1   Nov. 22, 2007

Related U.S. Application Data

(63) Continuation of application No. 10/023,976, filed on Dec. 18, 2001, now Pat. No. 7,209,488.

(51) Int. Cl.
H04L 12/28 (2006.01)
(52) U.S. Cl. ............... 370/406; 370/442; 370/445
(58) Field of Classification Search ........... 709/251, 709/202, 226, 224, 245, 201, 203, 231; 370/222–224, 370/460, 452, 424, 403, 258; 398/59, 67, 398/255, 94, 258, 50, 43, 33, 83, 69, 79, 398/3

See application file for complete search history.

(56) References Cited

U.S. PATENT DOCUMENTS 4,935,924 A   6/1990 Baxter
5,487,067 A   1/1996 Matsushige
5,715,251 A   2/1998 Du
5,907,554 A   5/1999 Klos et al.
5,935,214 A * 8/1999 Stiegler et al. ............ 709/238
5,946,315 A   8/1999 Ramfelt et al.
5,982,747 A * 11/1999 Ramfelt et al. ............ 370/224

(Continued)

OTHER PUBLICATIONS

MOST Specification Framework Version 1.1-07, published 1999.*

(Continued)

*Primary Examiner*—Michael J Moore, Jr.
(74) *Attorney, Agent, or Firm*—O'Shea Getz P.C.

(57) ABSTRACT

A method for data transmission via several data channels in a network linking several units to one another, where the units can function as data sources, data sinks or transceivers, includes the steps of arbitrarily assigning a first data channel to a first predetermined one or more connection segments; arbitrarily assigning the first channel to a second predetermined one or more connection segments other than the first predetermined one or more connection segments; and simultaneously transmitting data between two units across the first predetermined one or more connection segments via the first data channel, and between two or more other units across the second predetermined one or more connection segments via the first data channel. The data are transmitted in a first direction over the first predetermined at least one connection segment, and the data are transmitted in a second direction over the second predetermined at least one connection segment, where the first ands second directions are the same.

7 Claims, 1 Drawing Sheet

U.S. PATENT DOCUMENTS

| | | |
|---|---|---|
| 6,590,865 B1 * | 7/2003 | Ibaraki et al. ............... 370/230 |
| 6,647,327 B1 * | 11/2003 | Wolf et al. .................... 701/36 |
| 2002/0009091 A1 | 1/2002 | Taniguchi |
| 2002/0018481 A1 * | 2/2002 | Mor et al. ................... 370/403 |
| 2005/0152382 A1 * | 7/2005 | Stirling et al. .............. 370/403 |

OTHER PUBLICATIONS

Patrick Heck et al., "Media Oriented Synchronous Transfer-A Network Protocol for High Quality, Low Cost Transfer of Synchronous, Asynchronous, and Control Data on Fiber Optic", Sep. 1997.

* cited by examiner

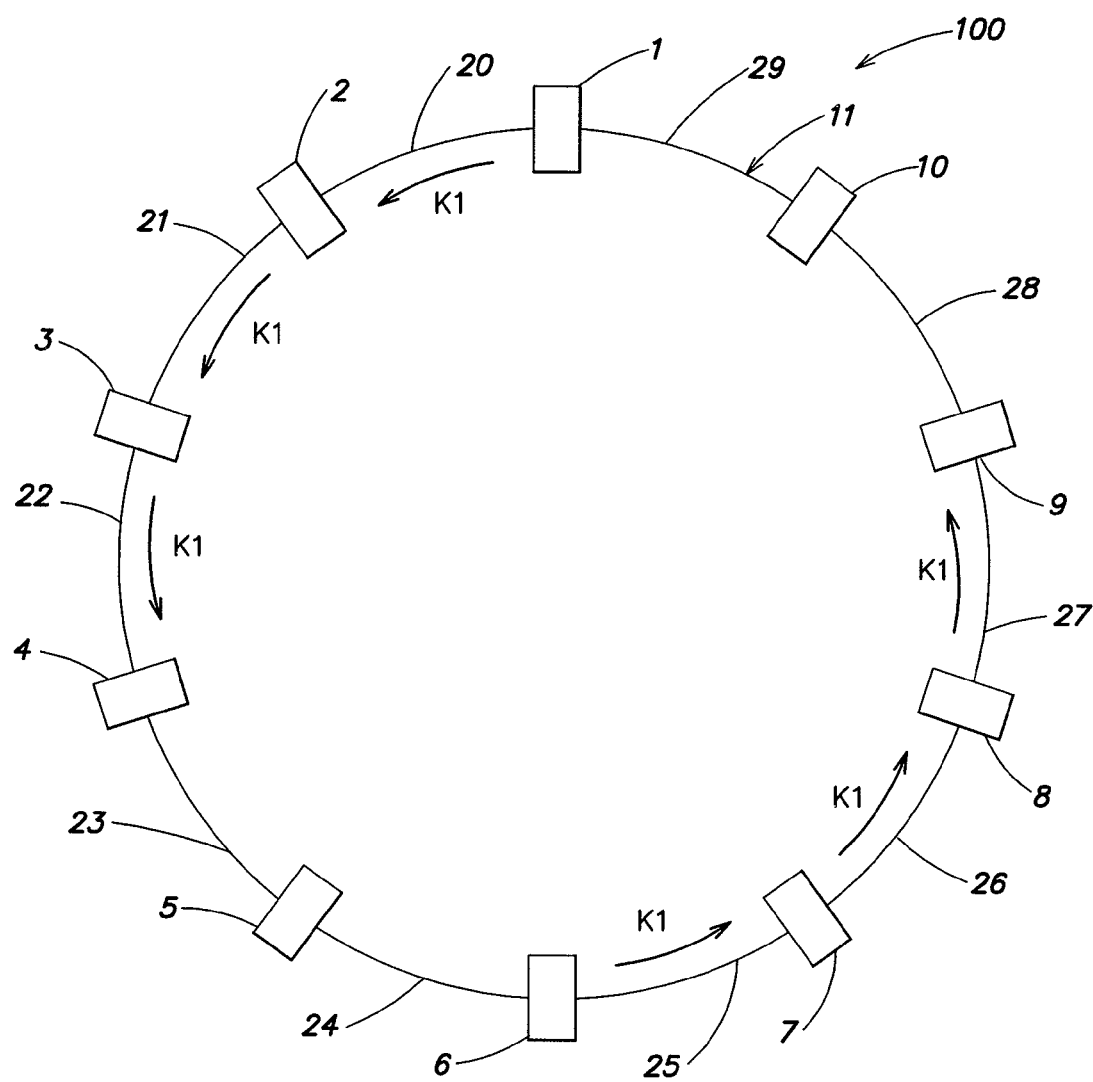

ASSIGNING A DATA CHANNEL TO MULTIPLE DATA LINKS FOR SIMULTANEOUS DATA TRANSMISSION VIA A SINGLE DATA CHANNEL

1. CLAIM OF PRIORITY

This application is a continuation of Ser. No. 10/023,976 filed Dec. 18, 2001, now U.S. Pat. No. 7,209,488.

2. FIELD OF THE INVENTION

The present invention relates generally to network communications and, more particularly, to selecting data channels to transmit data between different units of a network.

3. RELATED ART

Modern motor vehicles typically have equipment such as a multimedia system. In addition to the traditional car radio, such multimedia systems can include a number of other units such as a cassette player, CD player, DVD player, television receiver, navigation system, screen, loudspeaker boxes, and a car telephone with hands-free equipment, to mention only a few examples. The commercially-available Media Oriented Systems Transport or Media Oriented Synchronous Transfer (MOST) network standard has been proposed to facilitate communications between equipment of a multimedia system implemented in motor vehicles such as cars, trucks, buses and the like. The multimedia equipment that can be linked together in such a network operate as data sources, data receivers or sinks and data transceivers. Data sources include, for example, car radios, CD players, video recorders, TV tuners, etc. Data sinks include, for example, an audio amplifier to which several loudspeakers are connected, and a display screen which displays an uncompressed video signal. A MOST network is commonly contemplated to be a ring network linking all units of the network to all other units. Generally, in addition to operating as data receivers or data sources, units of a MOST network can also operate as data transceivers, receiving and re-transmitting data on the network that is not addressed to the unit itself.

As the quantity of units linked to one another on a MOST network increases, so too does the demand for available data channels for transmitting data between the network units. However, there is an inherent limitation in the quantity of available data channels of a MOST network. Conventionally, while a data channel is assigned to a connection segment between two communicating network units, the data channel is unavailable to support other communications on the network. As the quantity of assigned data channels increases, the quantity of remaining data channels decreases, ultimately adversely impacting the efficiency of the network communications.

Therefore, there is a need for a technique that increases the quantity of data channels that are available for data transmission in a MOST network.

SUMMARY

A method for data transmission via several data channels in a network linking several units to one another, where the units can function as data sources, data sinks or transceivers, includes the steps of assigning a first data channel to a first predetermined one or more connection segments; assigning the first channel to a second predetermined one or more connection segments other than the first predetermined one or more connection segments; and simultaneously transmitting data between two units across the first predetermined one or more connection segments via the first data channel, and between two or more other units across the second predetermined one or more connection segments via the first data channel. The data are transmitted in a first direction over the first predetermined at least one connection segment, and the data are transmitted in a second direction over the second predetermined at least one connection segment, where the first and second directions are the same.

The method reduces the need to specify a data channel that is not currently used in the network to establish a new connection between two units of the network, as conventionally implemented. In contrast, the method assigns to a new connection a data channel that is currently assigned to another connection. Thus, a data channel can have multiple assignments and occupations, resulting in relatively increased utilization of a limited number of data channels available on the network. This, in turn, provides for relatively increased transmission capacity on the network without increasing the total number of data channels implemented in the network.

These and other objects, features and advantages of the present invention will become more apparent in light of the following detailed description of preferred embodiments thereof, as illustrated in the accompanying drawings.

DESCRIPTION OF THE DRAWING

The sole FIGURE is a schematic diagram of a MOST ring network.

DETAILED DESCRIPTION

The following disclosure is directed to the efficient management of data channels in a network such as a network implementing the commercially-available Media Oriented System Transport or Media Oriented Synchronous Transfer (MOST) network standard. Generally, a network implemented or described herein utilizes the limited number of data channels available on the network in a relatively more efficient manner by assigning to a new connection a data channel that is currently assigned to another connection. This results in data channels having multiple assignments and occupations, increasing the transmission capacity of the network without increasing the total number of implemented data channels.

Referring to the FIGURE, a MOST network 100 includes ten network units 1-10 connected to a communication path 11 forming a ring network topology. The communication path 11 is formed of a plurality of connection segments 20-29 connecting adjacent network units 1-10. For example, connection segment 20 connects network units 1 and 2, while connection segment 21 connects network units 2 and 3, and so on.

The MOST network 100 may be implemented in a vehicle (not shown). As such, the network unit 1 may be a DVD player that transmits data to the network unit 4, which may be a monitor situated in the rear of the vehicle. At the same time, network unit 6, which for example may be a DVD changer also situated in the trunk of the vehicle, transmits video data to network unit 9, which may be a monitor situated in the dashboard of the vehicle.

The data transmitted from the DVD player 1, which for example is operating as a data source, are received and re-transmitted ("looped through") network units 2 and 3, both of which operate as transceivers, and are received by the monitor 4, which operates as a data sink. As is well known in the art, a data channel is typically specified to establish a data link between the DVD player 1 and the monitor 4. As illustrated, the data channel assigned to this data transmission is data channel labeled K1. The connection segment 20 connecting the network units 1 and 2, the connection segment 21 connecting the network units 2 and 3, and the connection segment 22 connecting the units 3 and 4, are allocated to the data channel K1.

The data transmitted from the DVD changer 6, which is operating as another data source, are forwarded by network units 7 and 8, operating as transceivers, to the associated data sink, which may be a monitor 9. Connection segments 25, 26 and 27, which lead from the DVD changer 6 to the monitor 9, are likewise allocated to the same data channel K1.

If needed, the still available connection segments 23, 24, 28 and 29 can also be allocated to data channel K1, if the network units 4 and 9 act as data sources and the units 5 or 6 and respectively 10 or 1 act as data sinks. This makes increased use of the limited number of available data channels, thus increasing the transmission capacity.

The allocation of individual connection segments to data channels Kn may be arbitrary, so that the connection segments can be advantageously allocated to the data channels Kn in a manner adapted to the prevailing transmission situation and operating condition. Also, the data transmitted via a same data channel may be transmitted in a similar direction over the network 100. For example, the data may be transmitted counterclockwise from the network unit 1 to the network unit 4, while the data may be transmitted counterclockwise from the network unit 6 to the network unit 9, both data transmissions occurring via the data channel K1.

It should be understood, however, that the present invention is not limited to a particular network topology and that the illustrative ring network 100 is by way of example only. Nor is there any restriction with regard to transmission direction (e.g., clockwise or counterclockwise). The present invention is suited to any network, regardless of its structure and given transmission direction. For example, in a ring network, data can be transmitted simultaneously clockwise and counterclockwise.

Although the present invention has been shown and described with respect to several preferred embodiments thereof, various changes, omissions and additions to the form and detail thereof, may be made therein, without departing from the spirit and scope of the invention.

What is claimed is:

1. A method for data transmission over a data channel in a network linking several units to one another, the method comprising the steps of:

assigning the data channel to a first predetermined at least one connection segment, where the data channel is part of a Media Oriented Systems Transport ("MOST") network;

assigning the data channel to a second predetermined at least one connection segment other than the first predetermined at least one connection segment; and transmitting data between at least two units across the first predetermined at least one connection segment via the data channel, and data between at least two other units across the second predetermined at least one connection segment via the data channel.

2. The method of claim 1, where the data are transmitted in a first direction around the MOST network ring topology over the first predetermined at least one connection segment, where the data are transmitted in a second direction around the MOST network ring topology over the second predetermined at least one connection segment, and where the first and second directions are the same.

3. The method of claim 2, where the first and second directions are clockwise around the MOST network.

4. The method of claim 2, where the first and second directions are counterclockwise around the MOST network.

5. A method for data transmission via a data channel in a Media Oriented Systems Transport (MOST) network linking several multimedia units to one another, the method comprising the steps of:

assigning the data channel in the MOST network to a first predetermined at least one connection segment;

assigning the data channel to a second predetermined at least one connection segment other than the first predetermined at least one connection segment; and transmitting data between a first plurality of the multimedia units across the first predetermined at least one connection segment via the data channel, and data between a second plurality of the multimedia units other than the first plurality of the multimedia units across the second predetermined at least one connection segment via the data channel, where the data are transmitted in a first direction around the MOST network ring topology over the first predetermined at least one connection segment, the data are transmitted in a second direction around the MOST network ring topology over the second predetermined at least one connection segment, and the first and second directions are the same.

6. The method of claim 5, where the first and second directions are clockwise.

7. The method of claim 5, where the first and second directions are counterclockwise.

* * * * *